United States Patent
Huang et al.

(10) Patent No.: US 11,481,572 B2
(45) Date of Patent: Oct. 25, 2022

(54) METHOD AND APPARATUS FOR EVALUATING ARTICLE VALUE BASED ON ARTIFICIAL INTELLIGENCE, AND STORAGE MEDIUM

(71) Applicant: BEIJING BAIDU NETCOM SCIENCE AND TECHNOLOGY CO., LTD., Haidian District Beijing (CN)

(72) Inventors: Bo Huang, Beijing (CN); Daren Li, Beijing (CN); Qiaoqiao She, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1177 days.

(21) Appl. No.: 16/001,111

(22) Filed: Jun. 6, 2018

(65) Prior Publication Data
US 2018/0349734 A1 Dec. 6, 2018

(30) Foreign Application Priority Data
Jun. 6, 2017 (CN) .......................... 201710417749.X

(51) Int. Cl.
G06K 9/62 (2022.01)
G06F 16/335 (2019.01)
G06F 16/9535 (2019.01)

(52) U.S. Cl.
CPC ........... G06K 9/623 (2013.01); G06F 16/335 (2019.01); G06F 16/9535 (2019.01);
(Continued)

(58) Field of Classification Search
CPC ............... G06F 16/335; G06F 16/9535; G06F 2216/03; G06K 9/623; G06K 9/6256; G06K 9/6257; G06K 9/6263
See application file for complete search history.

(56) References Cited

U.S. PATENT DOCUMENTS

| 6,366,759 | B1 * | 4/2002 | Burstein | G09B 7/00 434/350 |
| 2014/0229164 | A1 * | 8/2014 | Martens | G06F 40/40 704/9 |
| 2016/0321582 | A1 * | 11/2016 | Broudou | G06N 20/00 |

FOREIGN PATENT DOCUMENTS

| CN | 102279844 A | 12/2011 |
| CN | 102779220 A * | 11/2012 |

(Continued)

OTHER PUBLICATIONS

Search Report dated Feb. 4, 2021 for related Chinese Appln. No. 201710417749.X, 2 Pages.

(Continued)

*Primary Examiner* — Dakshesh D Parikh

(74) *Attorney, Agent, or Firm* — Brooks Kushman P.C.

(57) ABSTRACT

The present disclosure provides a method and apparatus for evaluating article value based on artificial intelligence, and a storage medium. The solution of present disclosure may be employed to pre-mine high-quality articles and low-quality articles as training data, and train according to the training data to obtain a value-scoring model. As such, value evaluation needs to be performed for the to-be-evaluated article, it is feasible to first perform feature extraction for the to-be-evaluated article, determine a score of the to-be-evaluated article based on the extracted features and the value-scoring model, and thereby implement effective evaluation of the article value.

21 Claims, 5 Drawing Sheets

(52) U.S. Cl.
CPC ......... *G06K 9/6256* (2013.01); *G06K 9/6257* (2013.01); *G06K 9/6263* (2013.01); *G06F 2216/03* (2013.01)

(56) References Cited

FOREIGN PATENT DOCUMENTS

| | | | | | |
|---|---|---|---|---|---|
| CN | 102779220 | A | | 11/2012 | |
| CN | 103634473 | A | | 3/2014 | |
| CN | 104021075 | A | | 9/2014 | |
| CN | 108280065 | A | * | 7/2018 | ............. G06F 40/51 |
| TW | 579470 | B | | 3/2004 | |

OTHER PUBLICATIONS

Search Report dated Aug. 19, 2020 for related Chinese Appln. No. 201710417749.X, 2 Pages.
Severyn et al., Learning to Rank Short Text Pairs with Convolutional Deep Neural Networks, Conference: the 38th International ACM SIGIR Conference, Aug. 31, 2015, Santiago, Chile, 11 pages.
Zhao Xin, Application progress of deep learning in recommendation algorithms, Abstract, [retrieved Apr. 7, 2017], retrieved from <URL: https://zhuanlan.zhihu.eom/p/26237106>, 3 pages.
Chinese Office Action dated Nov. 29, 2019, for related Chinese Appln. No. 201710417749.X; 4 Pages.
Chinese Search Report dated Nov. 14, 2019 for related Chinese Appln. No. 201710417749.X; 3 Pages.

* cited by examiner

METHOD AND APPARATUS FOR EVALUATING ARTICLE VALUE BASED ON ARTIFICIAL INTELLIGENCE, AND STORAGE MEDIUM The present application claims the priority of Chinese Patent Application No. 201710417749X, filed on Jun. 6, 2017, with the title of "Method and apparatus for evaluating article value based on artificial intelligence, and storage medium". The disclosure of the above applications is incorporated herein by reference in its entirety.

FIELD OF THE DISCLOSURE

The present disclosure relates to computer application technologies, and particularly to a method and apparatus for evaluating article value based on artificial intelligence, and a storage medium.

BACKGROUND OF THE DISCLOSURE

Artificial intelligence AI is a new technical science for researching and developing theories, methods, technologies and application systems for simulating, extending and expanding human intelligence. Artificial intelligence is a branch of computer sciences and attempts to learn about the essence of intelligence, and produces a new intelligent machine capable of responding in a manner similar to human intelligence. The studies in the field comprise robots, language recognition, image recognition, natural language processing, expert systems and the like.

To better satisfy the user in using his fragmented time, an information distribution platform of a mobile internet tries to recommend some new and short articles that can cater to the user's interest, to the user. To obtain more display opportunities, a content producer also caters to this demand, and produces more articles that can attract user's click and include less content.

As such, some articles that are truly valuable and informative cannot be displayed sufficiently, and the content producer has not motivation to produce such articles, thereby forming a vicious circle so that high-quality articles become less and less whereas low-quality articles without less value become more and more.

The increase of low-quality articles is an extremely large threat to whether the user believes information resources of the Internet.

Hence, it is necessary to, upon information distribution, minimize the number of low-quality articles but increase the number of high-quality articles, to enable the user to obtain more high-quality resources, encourage creation of high-quality articles while enhancing the user's experience, and thereby create a healthy ecology of internet content.

Correspondingly, it is necessary to evaluate the value of articles and thereby regard articles with higher value as high-quality articles and recommend them to the user. However, there is not yet an effective value-evaluating method in the prior art.

SUMMARY OF THE DISCLOSURE

In view of the above, the present disclosure provides a method and apparatus for evaluating article value based on artificial intelligence, and a storage medium.

Specific technical solutions are as follows:

A method for evaluating article value based on artificial intelligence, comprising:

mining high-quality articles and low-quality articles as training data, and training according to the training data to obtain a value-scoring model;

performing feature extraction for a to-be-evaluated article;

determining a score of the to-be-evaluated article based on the extracted features and the value-scoring model.

According to a preferred embodiment of the present disclosure, the mining the training data comprises:

mining the training data according to manually-annotated information, the user's feedback, and preset mining rules.

According to a preferred embodiment of the present disclosure, the mining the training data according to manually-annotated information, the user's feedback, and preset mining rules comprises:

regarding articles corresponding to manually-annotated high-quality content sources as high-quality articles, and adding the articles into the training data;

adding high-quality articles and low-quality articles determined according to the user's feedback behaviors, into the training data;

regarding articles having pre-set low-quality article features as low-quality articles, and adding the articles into the training data.

According to a preferred embodiment of the present disclosure, the performing feature extraction for a to-be-evaluated article comprises:

extracting one or any combination of the following features respectively with respect to each paragraph in the to-be-evaluated article:

relevance between the paragraph and a title of the to-be-evaluated article;

relevance between the paragraph and a preceding neighboring paragraph of the paragraph;

the number of newly-added words in the paragraph;

the total number of words in the paragraph;

whether the paragraph begins with a subtitle;

the number of pictures in the paragraph;

the number of sentences in the paragraph;

an average length of the sentences in the paragraph;

the number of pronouns in the paragraph.

According to a preferred embodiment of the present disclosure, the method further comprises:

comparing the score with a preset threshold, and determining whether the to-be-evaluated article is a high-quality article or a low-quality article.

According to a preferred embodiment of the present disclosure, the method further comprises:

obtaining M preset low-quality article features, M being a positive integer;

if the to-be-evaluated article has any low-quality article feature, the to-be-evaluated article is determined as the low-quality article.

According to a preferred embodiment of the present disclosure, the low-quality article features include one or any combination of the following:

repetitious content in the article exceeds a predetermined threshold;

the number of characters in the article is less than a predetermined threshold, and the article does not contain a picture;

the article includes a paragraph in which the number of characters exceeds a predetermined threshold;

the article includes a case that the expression is incomplete;

a typographic error exists in the article.

An apparatus for evaluating article value based on artificial intelligence, comprising: a mining unit, a training unit and an evaluating unit;

the mining unit is configured to mine high-quality articles and low-quality articles as training data, and send the training data to the training unit;

the training unit is configured to training according to the training data to obtain a value-scoring model, and send the value-scoring model to the evaluating unit;

the evaluating unit is configured to perform feature extraction for a to-be-evaluated article, and determine a score of the to-be-evaluated article based on the extracted features and the value-scoring model.

According to a preferred embodiment of the present disclosure, the mining unit mines the training data according to manually-annotated information, the user's feedback, and preset mining rules.

According to a preferred embodiment of the present disclosure, the mining unit regards articles corresponding to manually-annotated high-quality content sources as high-quality articles, and adds the articles into the training data;

the mining unit adds high-quality articles and low-quality articles determined according to the user's feedback behaviors, into the training data;

the mining unit regards articles having pre-set low-quality article features as low-quality articles, and add the articles into the training data.

According to a preferred embodiment of the present disclosure, the evaluating unit extracts one or any combination of the following features respectively with respect to each paragraph in the to-be-evaluated article:

relevance between the paragraph and a title of the to-be-evaluated article;

relevance between the paragraph and a preceding neighboring paragraph of the paragraph;

the number of newly-added words in the paragraph;

the total number of words in the paragraph;

whether the paragraph begins with a subtitle;

the number of pictures in the paragraph;

the number of sentences in the paragraph;

an average length of the sentences in the paragraph;

the number of pronouns in the paragraph.

According to a preferred embodiment of the present disclosure, the evaluating unit is further configured to compare the score with a preset threshold, and determine whether the to-be-evaluated article is a high-quality article or a low-quality article.

According to a preferred embodiment of the present disclosure, the evaluating unit is further configured to obtain M preset low-quality article features, M being a positive integer;

if the to-be-evaluated article has any low-quality article feature, the to-be-evaluated article is determined as the low-quality article.

According to a preferred embodiment of the present disclosure, the low-quality article features include one or any combination of the following:

repetitious content in the article exceeds a predetermined threshold;

the number of characters in the article is less than a predetermined threshold, and the article does not contain a picture;

the article includes a paragraph in which the number of characters exceeds a predetermined threshold;

the article includes a case that the expression is incomplete;

a typographic error exists in the article.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, the solution of present disclosure is employed to pre-mine high-quality articles and low-quality articles as training data, and train according to the training data to obtain a value-scoring model. As such, value evaluation needs to be performed for the to-be-evaluated article, it is feasible to first perform feature extraction for the to-be-evaluated article, determine a score of the to-be-evaluated article based on the extracted features and the value-scoring model, and thereby implement effective evaluation of the article value.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
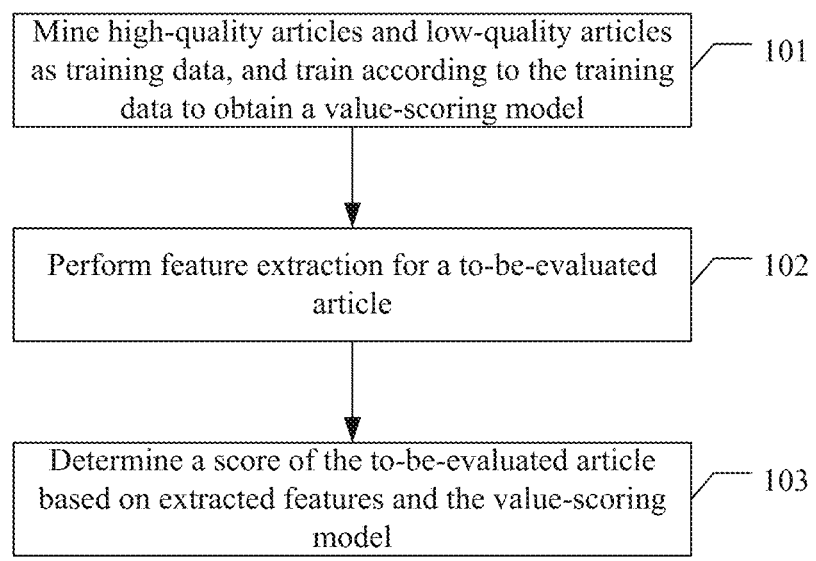
FIG. 1 is a flow chart of an embodiment of a method of evaluating article value based on artificial intelligence according to the present disclosure.

FIG. 1 is a flow chart of an embodiment of a method of evaluating article value based on artificial intelligence according to the present disclosure. As shown in FIG. 1, the embodiment comprises the following specific implementation mode.

101: mining high-quality articles and low-quality articles as training data, and training according to the training data to obtain a value-scoring model.

It is necessary to mine a lot of training data to train the value-scoring model. The value-scoring model is obtained by training according to the mined training data including high-quality article and low-quality articles.

In the present embodiment, it is feasible to mine the training data according to manually-annotated information, the user's feedback, preset mining rules and so on, which will be introduced respectively as follows.

1) Manually-Annotated Information

For example, it is possible to regard articles corresponding to manually-annotated high-quality content sources as high-quality articles, and add them into the training data.

Specifically, it is feasible to screen to obtain a batch of candidate content sources according to article issuance data quantity and activeness of content sources such as an author's website, then manually score according to comprehensive quality of articles issued by the candidate content sources, determine content sources whose scores exceed a predetermined threshold, as high-quality content sources, and add articles corresponding to the high-quality content sources into the training data as high-quality articles.

It can be seen that the above manner is mainly used to mine high-quality articles.

2) The User's Feedback Behaviors

For example, it is possible to add high-quality articles and low-quality articles determined according to the user's feedback behaviors, into the training data.

In practical application, after viewing an article, the user performs a series of feedback behaviors such as keeping the article as a favorite, commenting and sharing, so the training data may be mined according to the user's feedback behaviors.

For example, a certain article is commented by many users as an article with very low quality, it may be believed that this article is a low-quality article and added to the training data.

Again for example, a certain article is kept by many users as their favorites and read by each user in a long duration, it may be believed that this article is a high-quality article and added into the training data.

It can be seen that the above manner can be used to mine high-quality articles as well as low-quality articles.

3) Mining Rules

For example, it is possible to regard articles having pre-set low-quality article features as low-quality articles, and add them into the training data.

The low-quality article features may be preset. As such, after a certain article is analyzed, if it is found as having low-quality article features, the article may be regarded as a low-quality article, and added into the training data.

It can be seen that low-quality articles are mined mainly through preset rules/policies.

After an enough number of training data are obtained, the value-scoring model may be obtained by training according to the training data/

When training is performed, it is feasible to respectively perform feature extraction for high-quality articles and low-quality articles as the training data in the manner stated in subsequent 102, set a score of the high-quality articles as 1, set a score of the low-quality articles as 0, and then train to obtain the value-scoring model. How to train is of the prior art.

The value-scoring model may be a deep learning model such as a Recurrent Neural Network (RNN).

In 102, feature extraction is performed for a to-be-evaluated article.

The high-quality article usually has the following features: good typesetting, sufficient arguments, clear logic, definite opinions, professional terms and the like.

Based on the above features, it is possible to manually preset a plurality of features to be extracted, and extract these features with respect to the to-be-evaluated article.

For example, one or any combination of the following features may be extracted respectively with respect to each paragraph of the to-be-evaluated article.

Feature 1: relevance between the paragraph and a title of the to-be-evaluated article;

Feature 2: relevance between the paragraph and a preceding neighboring paragraph of the paragraph;

Feature 3: the number of newly-added words in the paragraph;

Feature 4: the total number of words in the paragraph;

Feature 5: whether the paragraph begins with a subtitle;

Feature 6: the number of pictures in the paragraph;

Feature 7: the number of sentences in the paragraph;

Feature 8: an average length of the sentences in the paragraph;

Feature 9: the number of pronouns in the paragraph.

Table 1 shows roles played by the features upon measuring the value of the article.

TABLE 1

Roles played by the features upon measuring the value of the article

| Features | Roles |
| --- | --- |
| Feature 1 | Whether opinions are definite |
| Feature 2 | Whether logic is clear |
| Feature 3 | Whether arguments are sufficient |
| Feature 4 | Whether typesetting is excellent |
| Feature 5 | Whether typesetting is excellent |
| Feature 6 | Whether typesetting is excellent |
| Feature 7 | Whether typesetting is excellent |
| Feature 8 | Whether typesetting is excellent |
| Feature 9 | Whether terms used are professional |

The above nine features may be extracted from each paragraph in the to-be-evaluated article.

Regarding the first paragraph in the to-be-evaluated article, since there is not a neighboring preceding paragraph of the paragraph, the relevance between the paragraph and the title may be regarded as the relevance between the paragraph and the neighboring preceding paragraph of the paragraph, namely, feature 1=feature 2.

Regarding a paragraph other than the first paragraph, for example, the second paragraph, feature 1 refers to the relevance between the second paragraph and the title, and feature 2 refers to the relevance between the second paragraph and the first paragraph.

In addition, feature 3 usually refers to the number of newly-added words in the paragraph as compared with all content preceding the content of the paragraph. For example, regarding the second paragraph, feature 3 may refer to the number of newly-added words in the second paragraph as compared with the content formed by the first paragraph and the title.

In the present embodiment, it is feasible to use a deep learning semantic similarity model which is obtained by pre-training and based on a Convolutional Neural Network (CNN), to determine Feature 1 and Feature 2, i.e., Feature 1 and Feature 2 may share one model, and the title is treated as a paragraph.

How to train the CNN-based deep learning semantic similarity model is of prior art. For example, it is possible to manually construct a sufficient number of training data and therefore train according to the training data to obtain the CNN-based deep learning semantic similarity model, for example, use one title and one paragraph to form a pair, namely, form a training sample, or use two paragraphs to form a pair. If two components in the pair come from the same article, the relevance corresponding to the pair may be set as 1, otherwise as 0.

In 103, a score of the to-be-evaluated article is determined based on the extracted features and the value-scoring model.

After the features stated in 102 are extracted, the extracted features may be input to the value-scoring model to obtain a score of the to-be-evaluated article output by the value-scoring model.

Since paragraphs of the article are in a sequence relationship, the RNN model may be employed as the value-scoring model as stated above.

Figure 2:
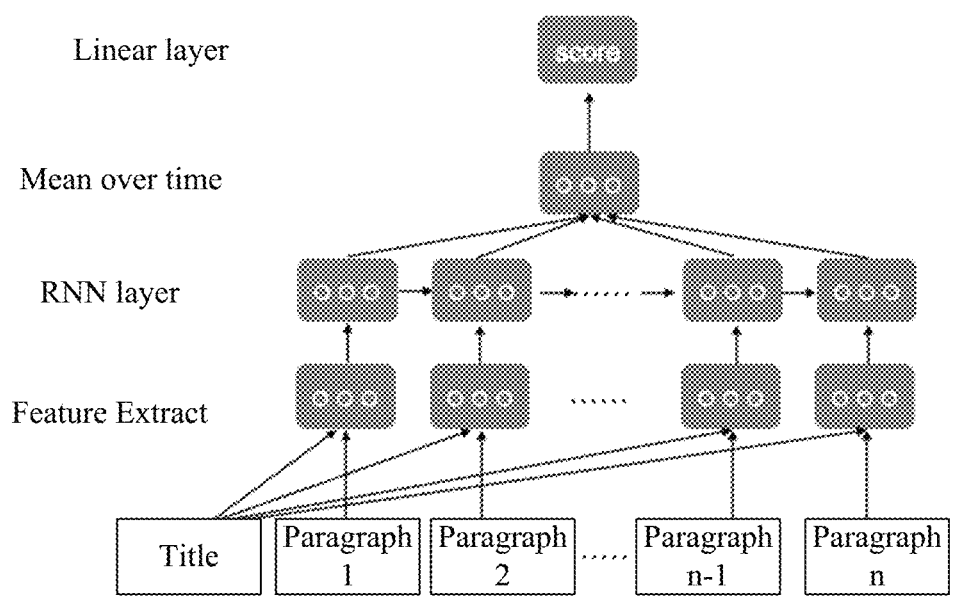
FIG. 2 is a structural schematic diagram of an RNN model according to the present disclosure.

FIG. 2 is a structural schematic diagram of an RNN model according to the present disclosure. As stated in FIG. 2, the model finally outputs a score whose value may be between 0 and 1. The higher the score is, the larger the value of the article is.

Regarding the to-be-evaluated article, after its score is obtained, it is feasible to compare the score with a preset threshold, and determine whether the to-be-evaluated article is a high-quality article or a low-quality article according to a comparison result.

For example, if the score is larger than the threshold, it may be determined that the to-be-evaluated article is a high-quality article, otherwise it is a low-quality article.

It can be seen that effective evaluation of the value of the article may be implemented in the manner of the above embodiment.

The value-scoring model is advantageous in strong generalization capability, but there might be a case that some articles apparently having low-quality article features cannot be recognized. To overcome the problem and further improve the accuracy of evaluation result, the following processing manner may be employed.

Obtaining M preset low-quality article features, M being a positive integer. If the to-be-evaluated article has any of the low-quality article features, the to-be-evaluated article is determined as the low-quality article.

Which specific features are regarded as low-quality article features may depend on actual situations, for example, the low-quality article features may include one or any combination of the following:

Feature A: repetitious content in the article exceeds a predetermined threshold;

Feature B: the number of characters in the article is less than a predetermined threshold, and the article does not contain a picture;

Feature C: the article includes a paragraph in which the number of characters exceeds a predetermined threshold;

Feature D: the article includes a case that the expression is incomplete;

Feature E: a typographic error exists in the article

Regarding Feature A, if a lot of repetitious content exists in the article, for example, the content of the title is repeatedly mentioned in many paragraphs, when the number of repetition reaches a certain degree, the article may be regarded as the low-quality article.

Regarding feature B, if the number of characters in the article is too small and there is no picture, the article may be regarded as the low-quality article.

Regarding Feature C, if the article includes a case that a paragraph contains too many characters, the article may be regarded as the low-quality article.

Regarding Feature D, if the title or text of the article includes a case in which the expression is incomplete, for example, "**star will show up at . . . today (Chinese expression: ＊＊明星今日现身 . . . )", the article may be regarded as the low-quality article.

Regarding Feature E, if a typographic error appears in the title or text of the article, the article may be regarded as the low-quality article.

Regarding the to-be-evaluated article, if it has any one of Features A-E, it may be regarded as the low-quality article.

To facilitate expression, the above manner of determining whether the to-be-evaluated article is a high-quality article or low-quality article according to the score is called the first evaluation manner, and the above manner of determining whether the to-be-evaluated article is a high-quality article or low-quality article according to low-quality article features is called the second evaluation manner.

In practical application, it is feasible to use the first evaluation manner and second evaluation manner in combination, namely, evaluate the value of the article based on two dimensions: expression of the content of the article and content depth. Specific combination manners are not limited. For example, regarding the to-be-evaluated article, if it is determined as the low-quality article in both the first evaluation manner and second evaluation manner, it is believed that the to-be-evaluated article is the low-quality article. Alternatively, after the to-be-evaluated article is determined as the high-quality article in the first evaluation manner, the second evaluation manner is further employed to determine whether the to-be-evaluated article is the high-quality article or low-quality article, if the article is determined as the low-quality article, it is believed that the to-be-evaluated article is the low-quality article, otherwise is the high-quality article.

Specific values of the thresholds involved in the above introduction all may depend on actual needs.

Figure 3:
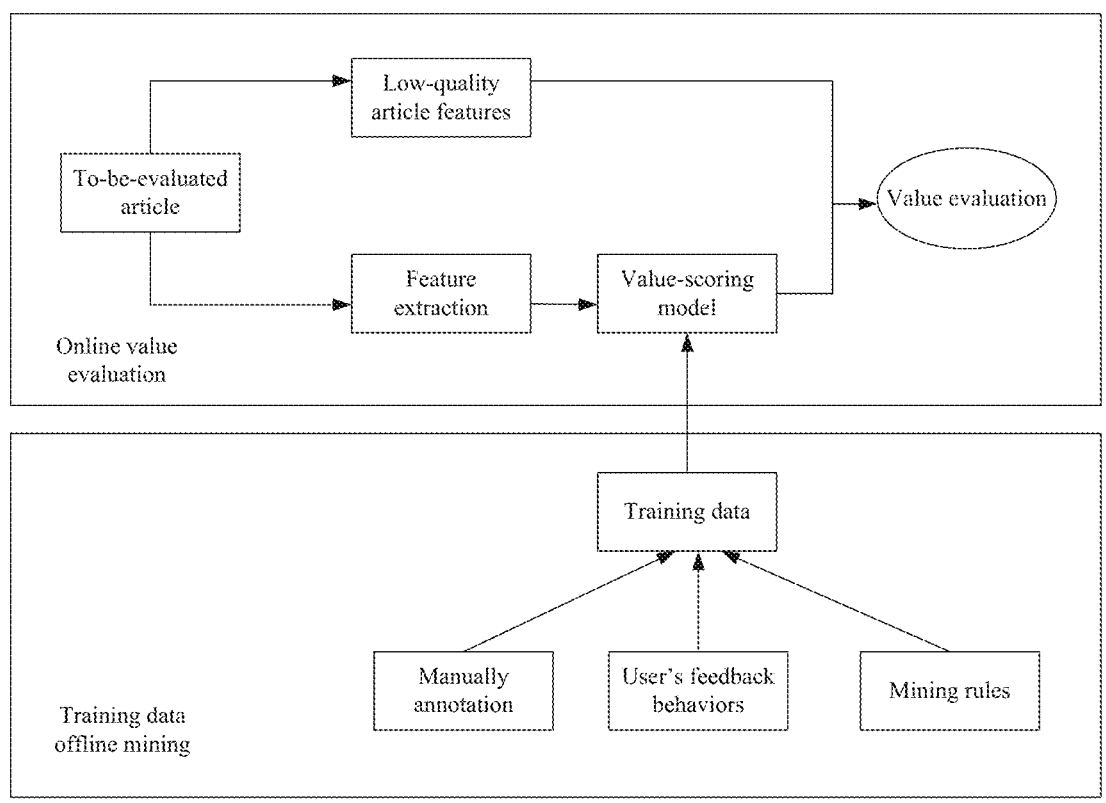
FIG. 3 is a schematic diagram of an implementation process of a method of evaluating article value based on artificial intelligence according to the present disclosure.

To conclude the above introduction, FIG. 3 is a schematic diagram of an implementation process of a method of evaluating article value based on artificial intelligence according to the present disclosure. As shown in FIG. 3, the implementation process is mainly formed by two portions: training data offline mining and online value evaluation.

As compared with the prior art, the above embodiments provide an effective evaluation manner of the value of the article; furthermore, the extracted features can accurately and visually reflect the level of quality of the article, thereby improving the accuracy of the evaluation result, and a better training effect may be obtained by using less training data. In addition, the two evaluation manners may be combined flexibly to facilitate flexible adjustment according to actual needs.

Correspondingly, it is necessary to, upon information distribution, minimize the number of low-quality articles but increase the number of high-quality articles, to enable the user to obtain more high-quality resources, encourage creation of high-quality articles while enhancing the user's experience, and thereby create a healthy ecology of internet content.

The above introduces the method embodiments. The solution of the present disclosure will be further described through an apparatus embodiment.

Figure 4:
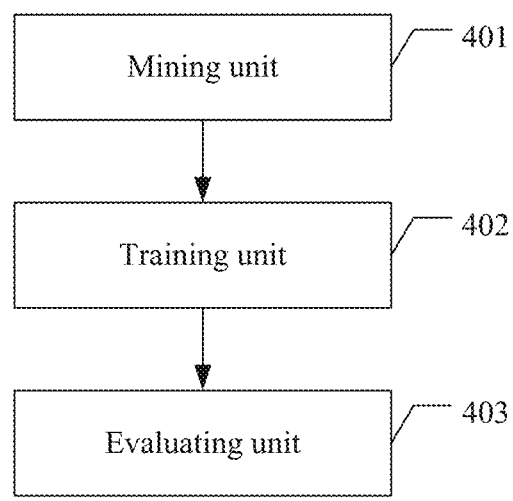
FIG. 4 is a block diagram of an embodiment of an apparatus for evaluating article value based on artificial intelligence according to the present disclosure.

FIG. 4 is a block diagram of an embodiment of an apparatus for evaluating article value based on artificial intelligence according to the present disclosure. As shown in FIG. 4, the apparatus comprises: a mining unit 401, a training unit 402 and an evaluating unit 403.

The mining unit 401 is configured to mine high-quality articles and low-quality articles as training data, and send the training data to the training unit 402.

The training unit 402 is configured to train according to the training data to obtain a value-scoring model, and send the value-scoring model to the evaluating unit 403.

The evaluating unit 403 is configured to perform feature extraction for a to-be-evaluated article, and determine a score of the to-be-evaluated article based on the extracted features and the value-scoring model.

It is feasible to mine a lot of training data to train the value-scoring model. The value-scoring model is obtained by training according to the mined training data including high-quality article and low-quality articles.

The mining unit 401 may mine the training data according to manually-annotated information, the user's feedback, preset mining rules and so on.

For example, the mining unit 401 may regard articles corresponding to manually-annotated high-quality content sources as high-quality articles, and add them into the training data.

Specifically, it is feasible to screen to obtain a batch of candidate content sources according to article issuance data quantity and activeness of content sources such as an author's website, then manually score according to comprehensive quality of articles issued by the candidate content sources, determine content sources whose scores exceed a predetermined threshold, as high-quality content sources, and add articles corresponding to the high-quality content sources into the training data as high-quality articles.

The mining unit 401 may further add high-quality articles and low-quality articles determined according to the user's feedback behaviors, into the training data.

In practical application, after viewing an article, the user performs a series of feedback behaviors such as keeping the article as a favorite, commenting and sharing, so the training data may be mined according to the user's feedback behaviors.

For example, a certain article is commented by many users as an article with very low quality, it may be believed that this article is a low-quality article and added to the training data.

Again for example, a certain article is kept by many users as their favorites and read by each user in a long duration, it may be believed that this article is a high-quality article and added into the training data.

The mining unit 401 may further regard articles having pre-set low-quality article features as low-quality articles, and add them into the training data.

The low-quality article features may be preset. As such, after a certain article is analyzed, if it is found as having low-quality article features, the article may be regarded as a low-quality article, and added into the training data.

After an enough number of training data are obtained, the training unit 402 trains according to the training data to obtain the value-scoring model.

The value-scoring model may be a deep learning model such as a Recurrent Neural Network (RNN).

After the above processing, upon performing value evaluation for the to-be-evaluated article, the evaluating unit 403 may first perform feature extraction for the to-be-evaluated article, and then determine the score of the to-be-evaluated article according to the extracted features and the value-scoring model.

The high-quality article usually has the following features: good typesetting, sufficient arguments, clear logic, definite opinions, professional terms and the like.

Based on the above features, a plurality of features to be extracted may be manually preset, and the evaluating unit 403 extracts these features with respect to the to-be-evaluated article.

Specifically, the evaluating unit 403 may extract one or any combination of the following features respectively with respect to each paragraph in the to-be-evaluated article:

relevance between the paragraph and a title of the to-be-evaluated article;
relevance between the paragraph and a preceding neighboring paragraph of the paragraph;
the number of newly-added words in the paragraph;
the total number of words in the paragraph;
whether the paragraph begins with a subtitle;
the number of pictures in the paragraph;
the number of sentences in the paragraph;
an average length of the sentences in the paragraph;
the number of pronouns in the paragraph.

The above nine features may be extracted from each paragraph in the to-be-evaluated article.

Roles played by the features upon measuring the value of the article are shown in Table 1.

The evaluating unit 403 may input the extracted features into the value-scoring model to obtain a score of the to-be-evaluated article output by the value-scoring model. The higher the score is, the larger the value of the article is.

Then, the evaluating unit 403 may further compare the score with a preset threshold, and determine whether the to-be-evaluated article is a high-quality article or a low-quality article.

For example, if the score is larger than the threshold, it may be determined that the to-be-evaluated article is a high-quality article, otherwise it is a low-quality article.

In addition, the evaluating unit 403 may further obtain M preset low-quality article features, M being a positive integer. If the to-be-evaluated article has any of the low-quality article features, the to-be-evaluated article is determined as the low-quality article.

Which specific features are regarded as low-quality article features may depend on actual situations, for example, the low-quality article features may include one or any combination of the following:

Feature A: repetitious content in the article exceeds a predetermined threshold;
Feature B: the number of characters in the article is less than a predetermined threshold, and the article does not contain a picture;
Feature C: the article includes a paragraph in which the number of characters exceeds a predetermined threshold;
Feature D: the article includes a case that the expression is incomplete;
Feature E: a typographic error exists in the article Regarding Feature A, if a lot of repetitious content exists in the article, for example, the content of the title is repeatedly mentioned in many paragraphs, when the number of repetition reaches a certain degree, the article may be regarded as the low-quality article.

Regarding feature B, if the number of characters in the article is too small and there is no picture, the article may be regarded as the low-quality article.

Regarding Feature C, if the article includes a case that a paragraph contains too many characters, the article may be regarded as the low-quality article.

Regarding Feature D, if the title or text of the article includes a case in which the expression is incomplete, for example, " star will show up at . . . today (Chinese expression:  明星今日现身 . . . )", the article may be regarded as the low-quality article.

Regarding Feature E, if a typographic error appears in the title or text of the article, the article may be regarded as the low-quality article.

Regarding the to-be-evaluated article, if it has any one of Features A-E, it may be regarded as the low-quality article.

To facilitate expression, the above manner of determining whether the to-be-evaluated article is a high-quality article or low-quality article according to the score is called the first evaluation manner, and the above manner of determining whether the to-be-evaluated article is a high-quality article or low-quality article according to low-quality article features is called the second evaluation manner.

In practical application, it is feasible to use the first evaluation manner and second evaluation manner in combination, namely, evaluate the value of the article based on two dimensions: expression of the content of the article and content depth. Specific combination manners are not limited. For example, regarding the to-be-evaluated article, if it is determined as the low-quality article in both the first evaluation manner and second evaluation manner, it is believed that the to-be-evaluated article is the low-quality article. Alternatively, after the to-be-evaluated article is determined as the high-quality article in the first evaluation manner, the second evaluation manner is further employed to determine whether the to-be-evaluated article is the high-quality article or low-quality article, if the article is determined as the low-quality article, it is believed that the to-be-evaluated article is the low-quality article, otherwise is the high-quality article.

Reference may be made to corresponding depictions in the aforesaid method embodiment for a specific workflow of the apparatus embodiment shown in FIG. 4. The workflow is not detailed any more As compared with the prior art, the above embodiment provides an effective evaluation manner of the value of the article; furthermore, the extracted features can accurately and visually reflect the level of quality of the article, thereby improving the accuracy of the evaluation result, and a better training effect may be obtained by using less training data. In addition, the two evaluation manners may be combined flexibly to facilitate flexible adjustment according to actual needs.

It is feasible to, upon information distribution, minimize the number of low-quality articles but increase the number of high-quality articles, to enable the user to obtain more high-quality resources, encourage creation of high-quality articles while enhancing the user's experience, and thereby create a healthy ecology of internet content.

Figure 5:
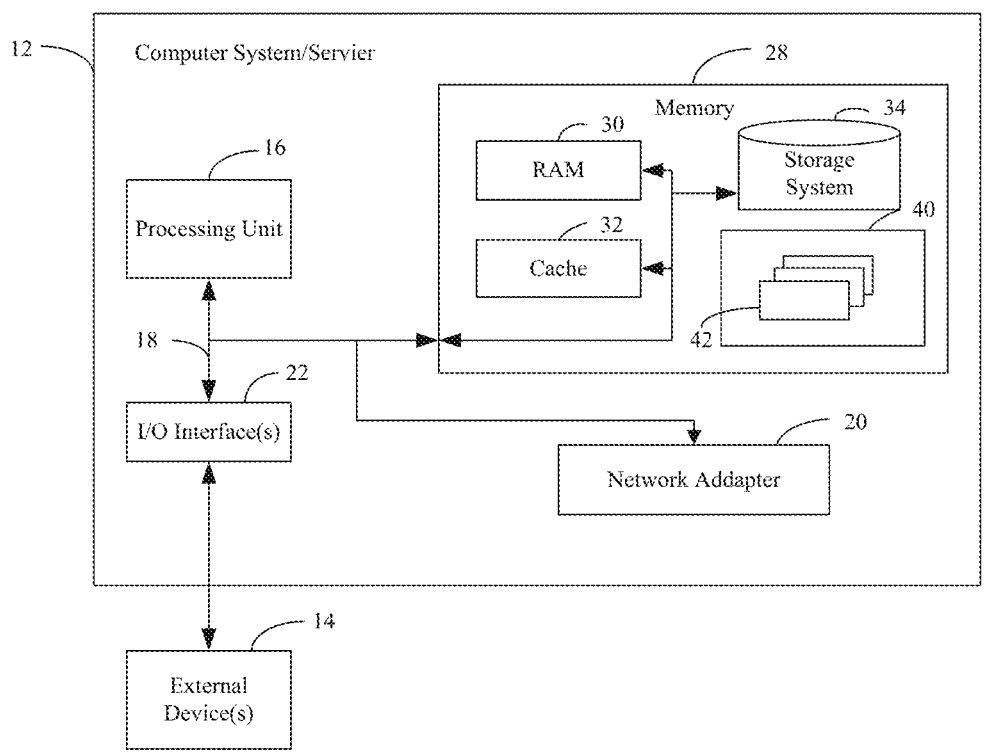
FIG. 5 is illustrates a block diagram of an example computer system/server 12 adapted to implement an implementation mode of the present disclosure.

FIG. 5 illustrates a block diagram of an example computer system/server 12 adapted to implement an implementation mode of the present disclosure. The computer system/server 12 shown in FIG. 5 is only an example and should not bring about any limitation to the function and scope of use of the embodiments of the present disclosure.

As shown in FIG. 5, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 5, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1, namely, mine high-quality articles and low-quality articles as training data, obtain a value-scoring model by training according to the training data, perform feature extraction for a to-be-evaluated article, and determine a score of the to-be-evaluated article based on the extracted features and the value-scoring model.

Reference may be made to related depictions in the above embodiments for specific implementations, which will not be detailed any more.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A computer implemented method for evaluating article value based on artificial intelligence, comprising:
   mining high-quality articles and low-quality articles as training data, and training according to the training data to obtain a value-scoring model, the value-scoring model being a deep learning Convolutional Neural Network model;
   performing feature extraction for a to-be-evaluated article, features extracted for the to-be-evaluated article comprising features which are extracted respectively with respect to each paragraph in the to-be-evaluated article;
   determining a score of the to-be-evaluated article based on extracted features and the value-scoring model;
   determining whether the to-be-evaluated article is a high-quality article or a low-quality article according to the score of the to-be-evaluated article to obtain a first evaluation result
   determining whether the to-be-evaluated article is a high-quality article or a low-quality article according to whether to-be-evaluated article has any one of M preset low-quality article features obtain a second evaluation result; and
   determining finally whether the to-be-evaluated article is a high-quality article or a low-quality article according to the first evaluation result and the second evaluation result.

2. The method according to claim 1, wherein
mining the training data comprises:
mining the training data according to manually-annotated information, user's feedback behaviors, and preset mining rules.

3. The method according to claim 2, wherein
the mining the training data according to manually-annotated information, user's feedback behaviors, and preset mining rules comprises:
regarding articles corresponding to manually-annotated high-quality content sources as high-quality articles, and adding the articles into the training data;

adding high-quality articles and low-quality articles determined according to user's feedback behaviors, into the training data;
regarding articles having preset low-quality article features as low-quality articles, and adding the articles into the training data.

4. The method according to claim 1, wherein
the performing feature extraction for a to-be-evaluated article comprises:
extracting one or any combination of the following features respectively with respect to each paragraph in the to-be-evaluated article:
relevance between the paragraph and a title of the to-be-evaluated article;
relevance between the paragraph and a preceding neighboring paragraph of the paragraph;
the number of newly-added words in the paragraph;
the total number of words in the paragraph;
whether the paragraph begins with a subtitle;
the number of pictures in the paragraph;
the number of sentences in the paragraph;
an average length of sentences in the paragraph;
the number of pronouns in the paragraph.

5. The method according to claim 1, wherein
the determining whether the to-be-evaluated article is a high-quality article or a low-quality article according to the score of the to-be-evaluated article comprises:
comparing the score with a preset threshold, and determining whether the to-be-evaluated article is a high-quality article or a low-quality article.

6. The method according to claim 5, wherein the method further comprises:
obtaining M preset low-quality article features, M being a positive integer;
the determining whether the to-be-evaluated article is a high-quality article or a low-quality article according to whether to-be-evaluated article has any one of M preset low-quality article features obtain a second evaluation result further comprises:
if the to-be-evaluated article has any low-quality article feature, determining the to-be-evaluated article as a low-quality article.

7. The method according to claim 6, wherein
the low-quality article features include one or any combination of the following:
the number of repetitious content in the article exceeds a predetermined threshold;
the number of characters in the article is less than a predetermined threshold, and the article does not contain a picture;
the article includes a paragraph in which the number of characters exceeds a predetermined threshold;
the article includes a case that the expression is incomplete;
a typographic error exists in the article.

8. A computer device, comprising a memory, a processor and a computer program which is stored on the memory and runs on the processor, wherein the processor, upon executing the program, implements the following operation:
mining high-quality articles and low-quality articles as training data, and training according to the training data to obtain a value-scoring model, the value-scoring model being a deep learning Convolutional Neural Network model;
performing feature extraction for a to-be-evaluated article, features extracted for the to-be-evaluated article comprising features which are extracted respectively with respect to each paragraph in the to-be-evaluated article;
determining a score of the to-be-evaluated article based on extracted features and the value-scoring model;
determining whether the to-be-evaluated article is a high-quality article or a low-quality article according to the score of the to-be-evaluated article to obtain a first evaluation result
determining whether the to-be-evaluated article is a high-quality article or a low-quality article according to whether to-be-evaluated article has any one of M preset low-quality article features obtain a second evaluation result; and
determining finally whether the to-be-evaluated article is a high-quality article or a low-quality article according to the first evaluation result and the second evaluation result.

9. The computer device according to claim 8, wherein
mining the training data comprises:
mining the training data according to manually-annotated information, user's feedback behaviors, and preset mining rules.

10. The computer device according to claim 9, wherein
the mining the training data according to manually-annotated information, user's feedback behaviors, and preset mining rules comprises:
regarding articles corresponding to manually-annotated high-quality content sources as high-quality articles, and adding the articles into the training data;
adding high-quality articles and low-quality articles determined according to user's feedback behaviors, into the training data;
regarding articles having preset low-quality article features as low-quality articles, and adding the articles into the training data.

11. The computer device according to claim 8, wherein
the performing feature extraction for a to-be-evaluated article comprises:
extracting one or any combination of the following features respectively with respect to each paragraph in the to-be-evaluated article:
relevance between the paragraph and a title of the to-be-evaluated article;
relevance between the paragraph and a preceding neighboring paragraph of the paragraph;
the number of newly-added words in the paragraph;
the total number of words in the paragraph;
whether the paragraph begins with a subtitle;
the number of pictures in the paragraph;
the number of sentences in the paragraph;
an average length of sentences in the paragraph;
the number of pronouns in the paragraph.

12. The computer device according to claim 8, wherein
the determining whether the to-be-evaluated article is a high-quality article or a low-quality article according to the score of the to-be-evaluated article comprises:
comparing the score with a preset threshold, and determining whether the to-be-evaluated article is a high-quality article or a low-quality article.

13. The computer device according to claim 12, wherein
the operation further comprises:
obtaining M preset low-quality article features, M being a positive integer;
the determining whether the to-be-evaluated article is a high-quality article or a low-quality article according to whether to-be-evaluated article has any one of M preset low-quality article features obtain a second evaluation result further comprises:

if the to-be-evaluated article has any low-quality article feature, determining the to-be-evaluated article as a low-quality article.

14. The computer device according to claim 13, wherein the low-quality article features include one or any combination of the following:

the number of repetitious content in the article exceeds a predetermined threshold;

the number of characters in the article is less than a predetermined threshold, and the article does not contain a picture;

the article includes a paragraph in which the number of characters exceeds a predetermined threshold;

the article includes a case that the expression is incomplete;

a typographic error exists in the article.

15. A non-transitory computer-readable storage medium on which a computer program is stored, wherein the program, when executed by a processor, implements the following operation:

mining high-quality articles and low-quality articles as training data, and training according to the training data to obtain a value-scoring model, the value-scoring model being a deep learning Convolutional Neural Network model;

performing feature extraction for a to-be-evaluated article, features extracted for the to-be-evaluated article comprising features which are extracted respectively with respect to each paragraph in the to-be-evaluated article;

determining a score of the to-be-evaluated article based on extracted features and the value-scoring model;

determining whether the to-be-evaluated article is a high-quality article or a low-quality article according to the score of the to-be-evaluated article to obtain a first evaluation result;

determining whether the to-be-evaluated article is a high-quality article or a low-quality article according to whether to-be-evaluated article has any one of M preset low-quality article features obtain a second evaluation result; and determining finally whether the to-be-evaluated article is a high-quality article or a low-quality article according to the first evaluation result and the second evaluation result.

16. The non-transitory computer-readable storage medium according to claim 15, wherein mining the training data comprises:

mining the training data according to manually-annotated information, user's feedback behaviors, and preset mining rules.

17. The non-transitory computer-readable storage medium according to claim 16, wherein the mining the training data according to manually-annotated information, user's feedback behaviors, and preset mining rules comprises:

regarding articles corresponding to manually-annotated high-quality content sources as high-quality articles, and adding the articles into the training data;

adding high-quality articles and low-quality articles determined according to user's feedback behaviors, into the training data;

regarding articles having preset low-quality article features as low-quality articles, and adding the articles into the training data.

18. The non-transitory computer-readable storage medium according to claim 15, wherein the performing feature extraction for a to-be-evaluated article comprises:

extracting one or any combination of the following features respectively with respect to each paragraph in the to-be-evaluated article:

relevance between the paragraph and a title of the to-be-evaluated article;

relevance between the paragraph and a preceding neighboring paragraph of the paragraph;

the number of newly-added words in the paragraph;

the total number of words in the paragraph;

whether the paragraph begins with a subtitle;

the number of pictures in the paragraph;

the number of sentences in the paragraph;

an average length of sentences in the paragraph;

the number of pronouns in the paragraph.

19. The non-transitory computer-readable storage medium according to claim 15, wherein the determining whether the to-be-evaluated article is a high-quality article or a low-quality article according to the score of the to-be-evaluated article comprises:

comparing the score with a preset threshold, and determining whether the to-be-evaluated article is a high-quality article or a low-quality article.

20. The non-transitory computer-readable storage medium according to claim 19, wherein the operation further comprises:

obtaining M preset low-quality article features, M being a positive integer;

the determining whether the to-be-evaluated article is a high-quality article or a low-quality article according to whether to-be-evaluated article has any one of M preset low-quality article features obtain a second evaluation result further comprises:

if the to-be-evaluated article has any low-quality article feature, determining the to- be-evaluated article as a low-quality article.

21. The non-transitory computer-readable storage medium according to claim 20, wherein the low-quality article features include one or any combination of the following:

the number of repetitious content in the article exceeds a predetermined threshold;

the number of characters in the article is less than a predetermined threshold, and the article does not contain a picture;

the article includes a paragraph in which the number of characters exceeds a predetermined threshold;

the article includes a case that the expression is incomplete;

a typographic error exists in the article.

* * * * *